United States Patent [19]

D'Auria et al.

[11] 4,188,087
[45] Feb. 12, 1980

[54] OPTICAL FIBRE POSITIONING FERRULE AND CONNECTOR COMPRISING SUCH A FERRULE

[75] Inventors: Luigi D'Auria; André Jacques; Christian Malsot, all of Paris, France

[73] Assignee: Thomson-CSF, Paris, France

[21] Appl. No.: 895,076

[22] Filed: Apr. 10, 1978

[30] Foreign Application Priority Data

Apr. 13, 1977 [FR] France ............................. 77 11060

[51] Int. Cl.² .............................................. G02B 5/14
[52] U.S. Cl. .................................. 350/96.20; 250/227;
350/96.15; 350/96.17; 356/400
[58] Field of Search ............... 350/96.15, 96.16, 96.17,
350/96.20, 96.21, 96.22, 96.18; 356/153, 400;
250/561, 227

[56] References Cited

U.S. PATENT DOCUMENTS

| 3,781,546 | 12/1973 | Christian et al. | 350/96.18 X |
| 3,918,814 | 11/1975 | Weiser | 356/153 X |
| 3,928,102 | 12/1975 | Rowe et al. | 350/96.15 X |
| 3,938,895 | 2/1976 | Bridger et al. | 350/96.20 X |
| 3,954,338 | 5/1976 | Hennel et al. | 356/153 X |
| 4,090,777 | 5/1978 | Wittke | 350/96.15 |
| 4,103,154 | 7/1978 | D'Auria et al. | 350/96.15 X |

FOREIGN PATENT DOCUMENTS 2237444 2/1974 Fed. Rep. of Germany ........ 350/96.15
2626243 12/1977 Fed. Rep. of Germany ........ 350/96.21

Primary Examiner—John K. Corbin
Assistant Examiner—John D. Lee
Attorney, Agent, or Firm—Cushman, Darby & Cushman

[57] ABSTRACT

The invention relates to a positioning ferrule for an optical fibre providing an adjustable connection between two fibres. The positioning ferrule according to the invention comprises detecting means for detecting the uncoupled radiation in the down-side fibre and therefore transmitted in the sheath of the latter. The process for adjusting a connector comprising said ferrule comprises producing a relative displacement of the axes of two fibres so that the detected radiation is minimum. The invention is applicable to long-distance optical telecommunications employing monomode optical fibres.

7 Claims, 11 Drawing Figures

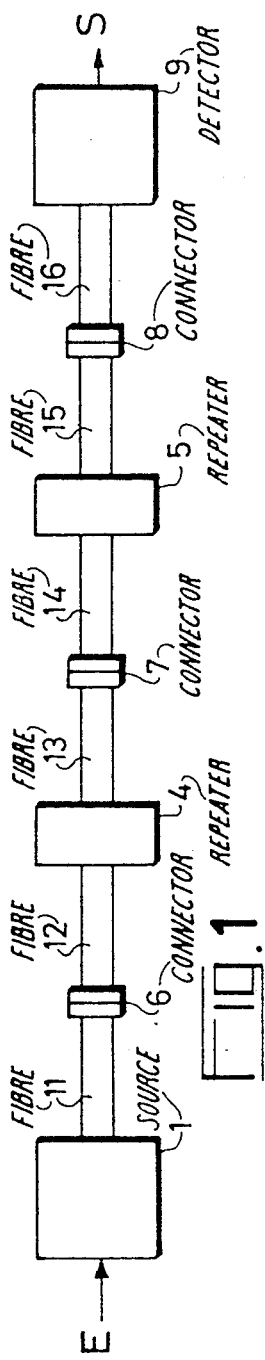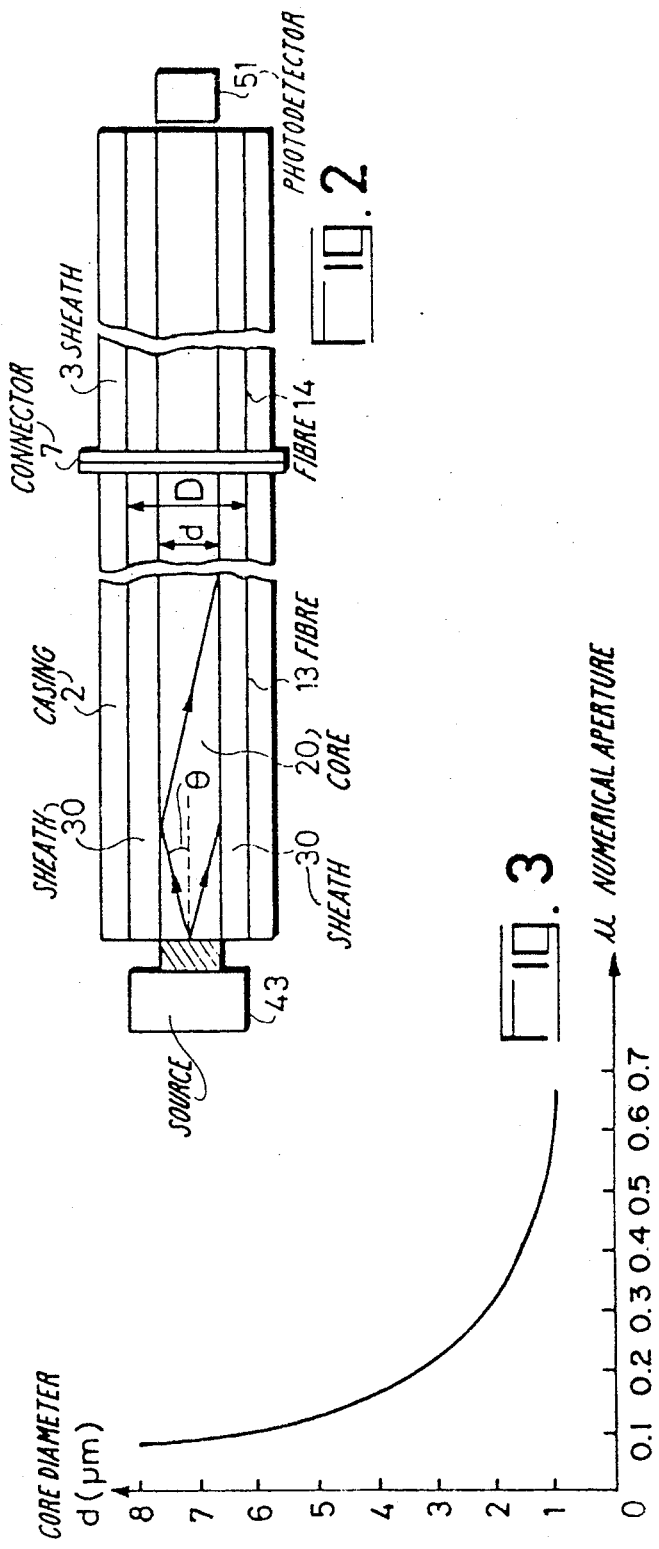

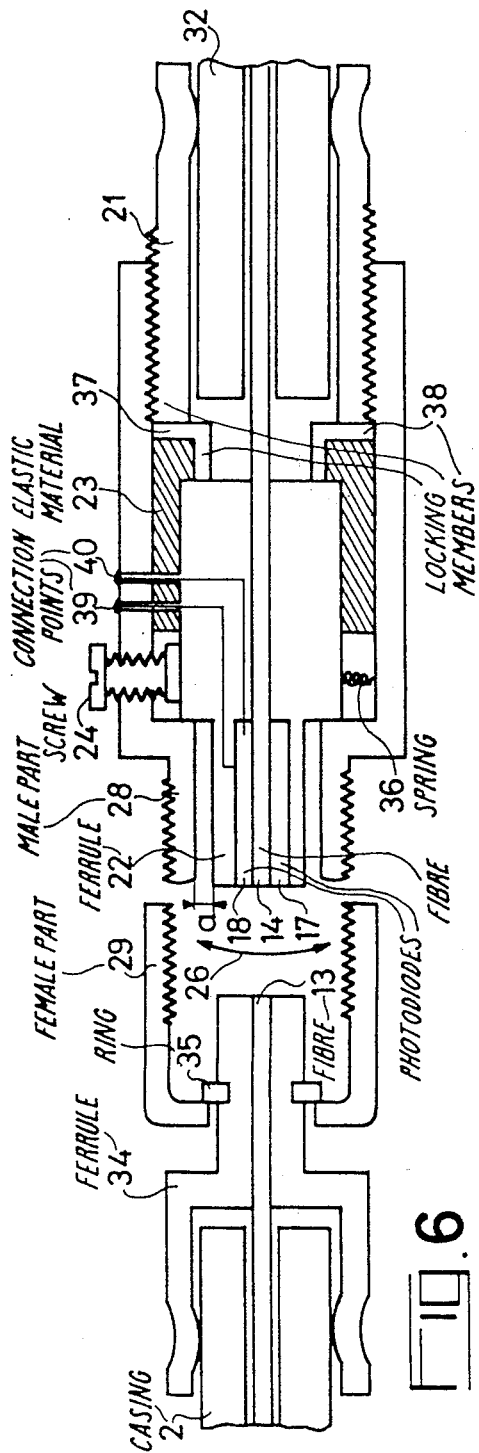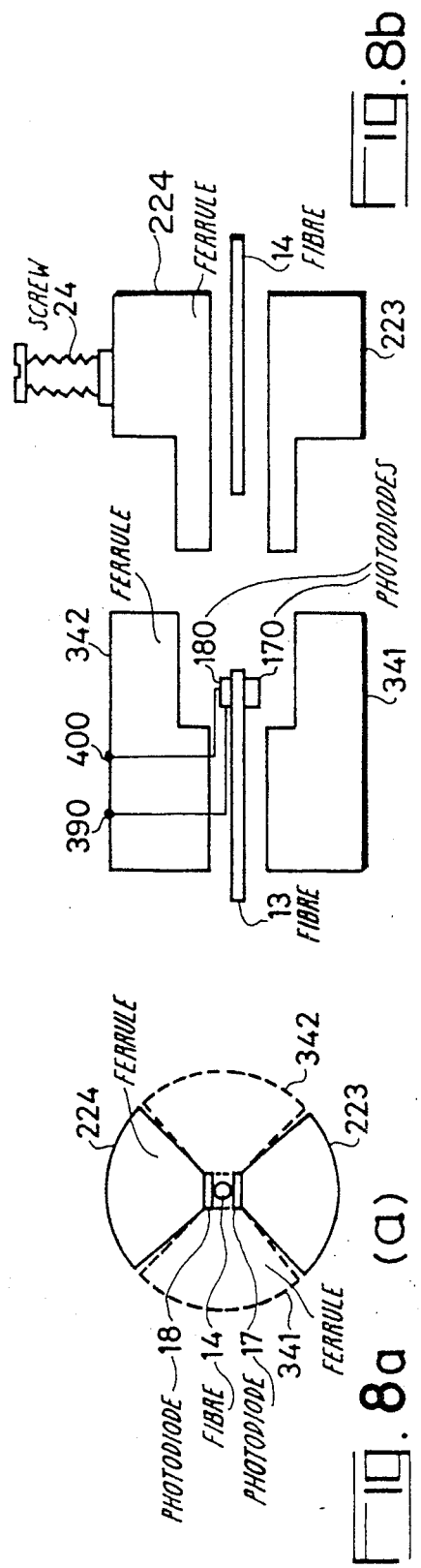

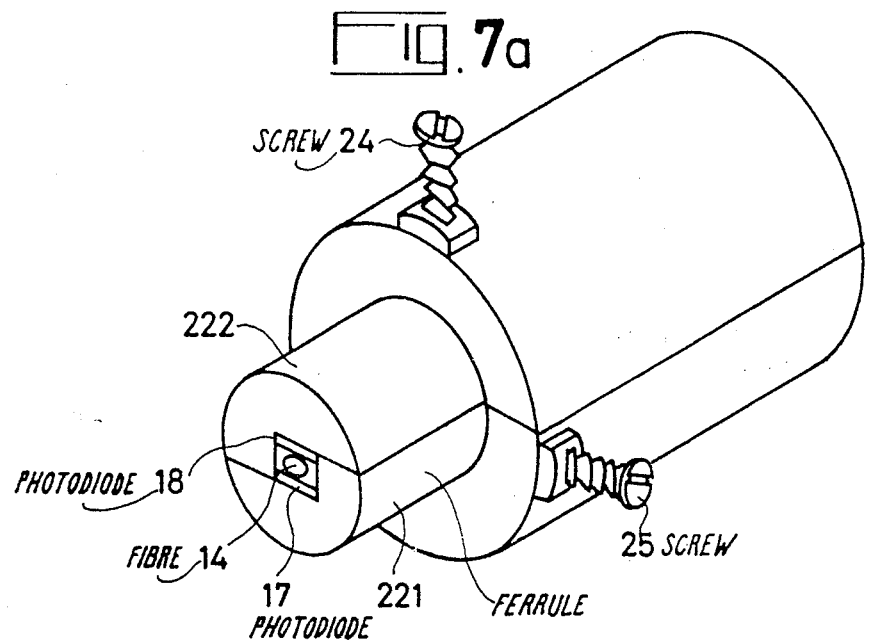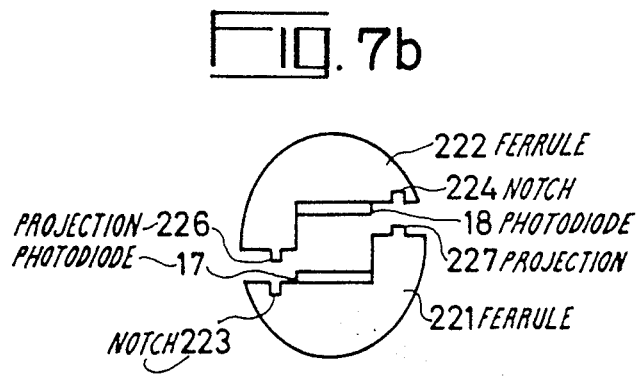

OPTICAL FIBRE POSITIONING FERRULE AND CONNECTOR COMPRISING SUCH A FERRULE

The present invention relates to a positioning ferrule for an optical fibre.

Long-distance optical telecommunications, in particular telephone transmission systems, employ optical monofibres as the medium of transmission. According to the type of propagation adopted in the fibre, the diameter of the core of a fibre varies from a few microns to around a hundred microns. The problem of the connection between fibres differs with the magnitude of the diameter. In the case of a connection between multimode fibres having a diameter equal to around one hundred microns, it is known to introduce each of the facing ends of the fibres in a cylindrical ferrule and to effect positioning by using the external surface of the ferrule as a datum. In the case of monomode fibres, of which the core diameter is a few $\mu$m, it is no longer possible to base the positioning on the exterior of the ferrule nor even on the external surface of the sheath of the fibre. Indeed, the core may be eccentric relative to the axis of the sheath in certain cases a distance exceeding the diameter of the core itself.

For the connection of two monomode fibres, it is therefore necessary to find the maximum transmission of the optical radiation from the up-side fibre to the down-side fibre. A first method comprises measuring the optical energy at the end of the down-side fibre and adjusting the connection by mechanical means so as to obtain a maximum of energy in said fibre. This method has in particular the following drawback: when a connection is adjusted at a point A it is necessary to detect the energy transmitted at a point B which may be located several kilometres from the point A.

The method proposed by the invention comprises measuring, at the very place of the connection, the energy resulting from losses of connection between the up-side fibre and the down-side fibre. The operator has the result of the adjustment at the very place of the connection. The connection between the monofibres according to the invention results from the connection between two ferrules: at least one, that of the down-side fibre, may be adjusted relative to the other. It comprises two photodetectors connected in parallel and producing a voltage which is a function of the transmission losses. This results in a simple, cheap and easily adjustable connection.

In accordance with the present invention, there is provided a positioning ferrule for an optical fibre propagating a radiation and comprising a core and a sheath, said ferrule comprising a rigid body inserting said fibre and being integral with said fibre, and photodetector means located within said body for receiving the fraction of energy travelling in said sheath.

For a better understanding of the invention and to show how the same may be carried into effect, reference will be made to the ensuing description, given by way of non limitative example, and the accompanying figures among which:

FIG. 1 represents a telecommunication connection through optical fibres;

FIG. 2 is a diagram of any connection between two fibres;

FIG. 3 shows the relation between the numerical aperture of a fibre and its diameter;

FIG. 6 represents an embodiment of the complete connection;

FIGS. 7a and 7b are a detailed view of the down-side ferrule;

FIGS. 8a and 8b represent a modification of the invention.

Figure 4A:
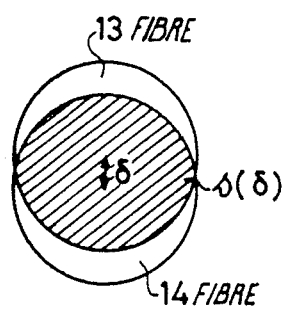
FIGS. 4a and 4b show the influence of the axial misalignment on the transmission losses.

FIG. 1 shows the diagram of a connection through optical fibres for long distance telecommunications, for example a telephone transmission system. An electrical signal is transmitted from an input E to an output S. An emitting device 1 injects into a transmission line a light beam having a wavelength $\lambda$ and being modulated by the input signal. The transmission line is formed by a succession of monofibres. Interposed in the line are optoelectronic repeaters for amplifying and regenerating the transmitted wave. Two repeaters are shown at 4 and 5. The distance between repeaters is typically several kilometers. As the length of a fibre is approximately 500 meters, there is a succession of fibres interconnected by connectors between two repeaters. Six fibres 11 to 16 and three connectors 6, 7, 8 are shown. The signal is recovered at the output end by a detector device 9. There are N monofibres between two repeaters or between the emitting device and the first repeater or between the last repeater and the detector device. Each assembly of N monofibres is preceded by a source of optical radiation and followed by a photodetector.

FIG. 2 is a longitudinal sectional view of the fibres 13 and 14 interconnected by the connector 7 and located between a source 43 which is part of the repeater 4 and a photodetector 51 which is part of the repeater 5. Each fibre comprises two coaxial media having different indices. For example, the fibre 13 has a core 20 with an index $n_1$ and a diameter d, and a sheath 30 with an index $2 < n_1$ and a diameter D. The numerical aperture $\mu$ of a fibre is defined by the expression: $u = \sqrt{n_1^2 - n_2^2} = n_1 \sin \theta$. $\theta$ is the semi-angle at the apex of a cone such that only the rays issuing from the optical radiation source 43 within the cone can be propagated in the fibre. This results from the condition of total reflection on the surface of separation between the core and sheath. It will be assumed hereinafter that the fibres 13 and 14 have the same core diameter and the same numerical aperture. For reasons of protection, the fibres 13 and 14 are surrounded by casings 2 and 3, respectively, which are usually of a flexible plastics material.

The total number n of propagation modes in a fibre is determined by the expression $2\pi(d/\lambda) u < K_n$. $K_n$ is a constant which increases with n. Thus it is possible to define a condition concerning the core diameter d so that the fibre be monomode: $d < K_1 \lambda / 2\pi u$ where $K_1$ is equal to 2.4048. The curve of FIG. 3 represents the variation of the maximum value of d as a function of the numerical aperture u for $\lambda = 0.83$ $\mu$m. This curve shows that the core diameter of a monomode fibre is of a few $\mu$m. The larger n is, the larger this diameter may be, which simplifies the problem of the connection. This problem is that of optical energy losses due to the coupling between two fibres. The principal cause of losses is the axial misalignment.

Figure 4B:
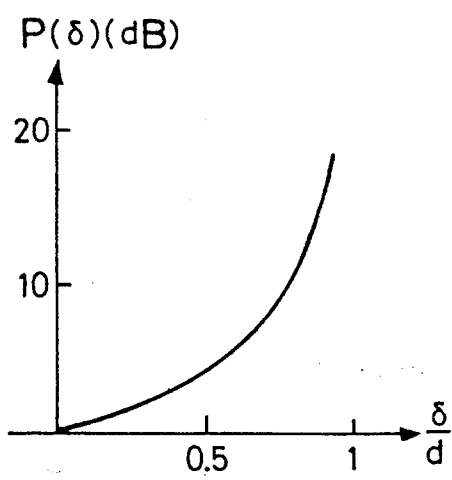

FIGS. 4a and 4b show the influence of the axial misalignment on the transmission losses. Shown in FIG. 4a, is a cross-sectional view of fibres 13 and 14 in the region of the connection. If $\delta$ is the axial misalignment, that is to say the distance between the axes of the two fibres, the coefficient of transmission $T(\delta)$, that is to say the ratio of the energy coupled in the fibre 14 and the optical energy propagated in the fibre 13 is $T(\delta) = 4s(\delta)/\pi d^2$, where $s(\delta)$ is the surface common to the cores of the two fibres. Shown in FIG. 4b, is the curve of variation of the losses $P(\delta) = 1 - T(\delta)$ as a function of the ratio $\delta/d$, obtained experimentally. For instance, if it is desired that the losses be lower than 1 dB, $\delta/d$ must be less than 0.3. In multimode fibres, in which d is about 90 μm and D about 120 μm, $\delta$ must be less than 30 μm. It is then possible to employ, for adjusting the connection, the exterior of the fibre as a mechanical reference and the required tolerances are easily obtained. On the other hand, in monomode fibres, in which d is of the order of 2 μm, $\delta$ must be less than 0.5 μm. This tolerance cannot be obtained by the foregoing process. Moreover, the core of the fibre is not itself perfectly centered relative to the sheath: its eccentricity may be as much as 5 μm, so that the exterior of the fibre is no longer a valid reference.

Figure 5:
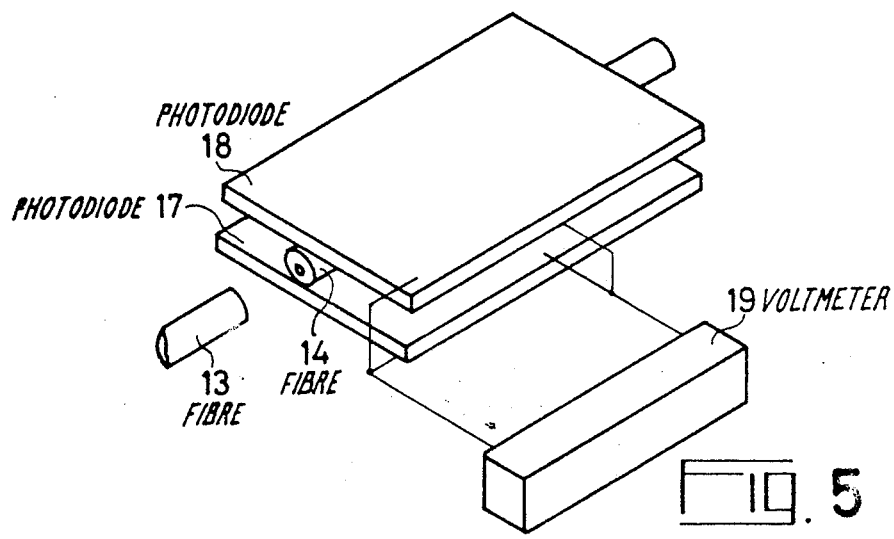
FIG. 5 is a diagram of the detection device within the down-side ferrule.

As a simple static adjustment of the connection is no longer sufficient, the invention proposes effecting a dynamic adjustment, that is to say employing for the two fibres to be connected two ferrules which are such that at least one comprises photodetector means which are adapted to receive the energy uncoupled between the two fibres and may be displaced relative to the other as a function of the result of the detection, so as to maximize the coefficient of transmission from the up-side fibre to the down-side fibre. The photodetectors may be photovoltaic, photoconductive or photoelectric. FIG. 5 is a diagram of photodetector means according to the invention. This device has the feature of being included in one of the ferrules: that of the down-side fibre. FIG. 5 shows the fibre 13 and the fibre 14 unconnected. The end of the down-side fibre 14, from which the casting has been previously removed, is placed between two parallel photodiodes 17 and 18. Each photodiode produces by a photovoltaic effect a voltage which is proportional to the energy of the received photons. As the two photodiodes are connected in parallel and connected to a voltmeter 19, there is obtained a measurement of the voltage which is roughly proportional to the sum of the optical powers detected by each photodiode. This sum roughly corresponds to the uncoupled optical power in the direction of the fibre 14, that is to say to the transmission losses. Indeed, only the light rays which are parallel to the photodiodes and make therewith a very small angle are not detected. This fraction of undetected energy may be considered as negligible. It is clear from the foregoing that the detection is only possible if the two fibres are connected and positioned with a tolerance of about 5 μm, so that the misalignment is at the most equal to the core diameter and the energy is coupled between the two fibres. This prepositioning to within 4 or 5 μm is possible with known processes, for example by employing the exterior of the fibres as a reference. It is unnecessary to polarize the photodiodes and the voltmeter may be directly connected to the terminals of the latter so as to receive the detected voltage. However, in order to improve the precision, they could be polarized. In this case, the polarization circuit may be included in an exterior case, for example the same as that of the voltmeter 19. Moreover, it is unnecessary that the relation between the voltage to be measured and the detected power be perfectly linear, since it is sufficient to seek a minimum of losses. Photodiodes of ordinary cheap silicon type are suitable for the invention. As the sensitive surface of these photodiodes is a few square millimeters, that is to say is very large relative to the overall size of the fibre, this justifies considering that the fraction of undetected energy is negligible.

FIG. 6 shows a longitudinal sectional view of an embodiment of the ferrules of the fibres 13 and 14 and the connector between these two fibres, given by way of non limitative example. The ferrule 34 of the up-side fibre is fixed. It is formed by a rigid member surrounding the end of the fibre 13 from which the casing has been removed and is clipped on the sheath of the fibre. It is combined with the female part 29 of the connector which has a screw-thread and is free to rotate for the purpose of screwing on the male part. It is held against movement in translation by a ring-shaped member 35 fixed to the ferrule 34. The ferrule 22 of the down-side fibre may be adjusted in two perpendicular directions by means of two microm er screws 24 and 25 only the screw 24 of which can be seen in the figure. The displacement of the fibre 14 and its ferrule produced by the screw 24 is diagrammatically represented by the arrow 26. This displacement occurs with respect to the male part 28 of the connector which is fixed to the female part by screwing. The screws 24 and 25 are screwed in tapped orifices formed in the male part 28. They bear against the ferrule 22. The clearance a between the ferrule 22 and the male part 28 of the connector is at most equal to the core diameter of the fibre, which enables the aforementioned prepositioning condition to be conformed to. The ferrule 22 comprises the photodiodes 17 and 18 according to the arrangement shown in FIG. 5. It is mounted in a member 23 formed from an elastic material, for example neoprene. This member is deformed when the screws 24 and 25 are acted upon. At the end of the adjustment, it maintains the ferrule 22 in position since it is integral with the connector. This maintenance may be improved by two springs located opposite the micrometer screws. Shown opposite the screw 24 is a spring 36 of the blade spring type located in the connector. The ferrule 22 is locked in translation, on one hand, owing to its shape which abuts the male part of the connector 28 and, on the other hand, owing to L-shaped members 37 and 38, for example of plexiglass, which are blocked against the ferrule 22 by a member 21 which has a screwthread whereby it may be screwed inside the end of the connector 28 opposed to the connection. The member 21 is clipped on the casing 32 of the fibre 14 after screwing. Two connection points 39 and 40, located on the top of the connector 28, allow easy access to the two ends of the two photodiodes placed in parallel.

The ferrule 22 of the fibre 14 is shown in perspective in FIG. 7a and in section in FIG. 7b. It comprises two parts 221 and 222 which perfectly fit together around the fibre 14 and respectively support the photodiodes 17 and 18 so as to produce the structure of FIG. 5. The perspective view in FIG. 7a moreover shows the position of the two micrometer screws 24 and 25 acting on the axis of the fibre in two perpendicular directions. The sectional view in FIG. 7b shows how the two parts 221 and 222 fit together. Locking against rotation is ensured by the shape of the parts. Moreover, a locking against translation may be provided by means of one or two small cylindrical notches. In the figure, the notches 223 and 224 respectively receive projections 226 and 227 of the opposite part.

The connection according to the invention may be adjusted in the following manner:

positioning of the ferrule 22 around the fibre 14;

insertion of the members 28, 23, 37, 38, 21, in the body of the connector 27 and locking by means of the screwthread of the member 21;

likewise, positioning of the members 34, 35, 29 around the fibre 13;

locking of the male part and female part of the connector;

connection of the voltmeter 19 and emission of the light radiation;

action on the screws 24 and 25 in order to obtain a minimum of the detected voltage.

The last stage may be carried out in only two operations if the axes of the displacements produced by each of the screws are exactly orthogonal. Otherwise, the adjustment is carried out by successive adjustments of approach.

The described embodiment of the connector requires that the ferrules of the two fibres to be interconnected be different. The two ends of a given fibre therefore have two different ferrules. This results in a manufacturing complication. Moreover, when the optical connection is placed in position, the direction of propagation of the energy must be known. According to a modification of the invention, there is provided a single ferrule arranged in such manner that the up-side ferrule and the down-side ferrule of a connection are identical. Thus the same connection operates irrespective of the direction of propagation of the energy. This modification is shown diagrammatically in FIGS. 8a and 8b. There is shown in FIG. 8a a cross-section of the ferrule of one of the fibres, for example the ferrule 22 of the down-side fibre 14. The ferrule 34 of the up-side fibre 13 is exactly the same. The end of the ferrule 22 comprises two parts 223 and 224 of frustoconical shape arranged in such manner that the two parts of the end of the end piece 34: 341 and 342 perfectly fit therein. The ferrule 22 comprises the two photodetectors 17 and 18. Likewise, the ferrule 34 comprises two photodetectors 170 and 180 contained in a plane perpendicular to the section and seen in the longitudinal sectional view of FIG. 8b. Seen in this sectional view are the two parts 341 and 342 of the end of the ferrule 34 and a part 223 of the end of the ferrule 23. The photodetectors 17 and 18 cannot be seen. Each ferrule carries an adjusting screw: only the screw 24 on the ferrule 22 is seen in the ferrule. The screw 25 on the ferrule 34 is perpendicular to the plane of the section. Provided on the ferrule 22 are the two connection points 39, 40 (not seen) and on the ferrule 34 two connection points 390, 400. For each ferrule, these points are connected to the two ends of the two photodetectors arranged in parallel. Although only the photodetectors of the down-side ferrule are employed, since the energy detected by the other two is zero, it is possible when adjusting, to connect these connections in pairs to the voltmeter. Consequently, the user has no need to take into account the direction of propagation of the energy. This ferrule may moreover be employed for an energy source-fibre connection or a fibre-detector connection.

What we claim is:

1. A positioning ferrule for an optical fibre propagating a radiation and comprising a core and a sheath, said ferrule comprising a rigid body inserting said fibre and being integral with said fibre, and photodetector means located within said body for receiving the fraction of energy travelling in said sheath.

2. A positioning ferrule as claimed in claim 1, wherein said body comprises two parts which fit perfectly together, and wherein said photodetector means comprise two parallel photodiodes respectively supported by said two parts.

3. A connector between a first and a second fibre propagating a radiation, said connector comprising a first part and a second part which can be bound together, said first and second parts respectively containing a first and a second ferrule respectively bound to said first and second fibres, said first part comprising first adjusting means for producing a displacement of said first ferrule in said first part, in order to produce a relative displacement of the axes of said first and second fibres in two perpendicular directions, the ferrule located down-side relative to the direction of propagation of said radiation being as claimed in claim 1.

4. A connector as claimed in claim 3, wherein said first adjusting means are acted in order to reduce the fraction of energy received by said detection means.

5. A connector as claimed in claim 4, wherein the ferrule located down-side is said first ferrule, said second ferrule being fixed in said second part.

6. A connector as claimed in claim 4, wherein said first and second ferrules are identical.

7. A connector between a fibre and a source emitting an optical radiation, wherein said fibre is inserted in a ferrule as claimed in claim 1, said connector comprising adjusting means for producing a relative displacement of the source and the fibre.

* * * * *